United States Patent
Kim et al.

(10) Patent No.: US 9,137,850 B2
(45) Date of Patent: Sep. 15, 2015

(54) WIRED/WIRELESS CONVERGED MAC ADAPTOR AND METHOD OF TRANSMITTING FRAME USING WIRED/WIRELESS CONVERGED MAC ADAPTOR

(71) Applicant: Electronics and Telecommunications Research Institute, Daejeon (KR)

(72) Inventors: Kwang Ok Kim, Jeonbuk (KR); Seung Il Myong, Daejeon (KR); Sang Soo Lee, Daejeon (KR); Jong Hyun Lee, Daejeon (KR)

(73) Assignee: Electronics and Telecomunications Research Institute, Daejeon (KR)

( * ) Notice: Subject to any disclaimer, the term of this patent is extended or adjusted under 35 U.S.C. 154(b) by 66 days.

(21) Appl. No.: 13/729,582

(22) Filed: Dec. 28, 2012

(65) Prior Publication Data

US 2013/0170375 A1    Jul. 4, 2013

(30) Foreign Application Priority Data

Dec. 30, 2011   (KR) ........................ 10-2011-0147676

(51) Int. Cl.
*H04W 88/06*    (2009.01)
*H04L 27/26*    (2006.01)
*H04L 5/00*    (2006.01)

(52) U.S. Cl.
CPC ........... *H04W 88/06* (2013.01); *H04L 27/2602* (2013.01); *H04L 5/0091* (2013.01)

(58) Field of Classification Search
CPC .. H04W 88/06; H04L 27/2602; H04L 5/0091

USPC .................................................. 370/203, 466
See application file for complete search history.

(56) References Cited

U.S. PATENT DOCUMENTS

| | | | |
|---|---|---|---|
| 8,718,473 B2* | 5/2014 | Zhang et al. ..................... 398/72 |
| 2009/0274077 A1* | 11/2009 | Meylan et al. ................ 370/280 |
| 2009/0274109 A1* | 11/2009 | Zhang et al. .................. 370/329 |
| 2010/0034141 A1* | 2/2010 | Meylan .......................... 370/328 |
| 2010/0054735 A1* | 3/2010 | Wei et al. ........................ 398/26 |
| 2010/0061470 A1 | 3/2010 | Wei et al. | |

(Continued)

OTHER PUBLICATIONS

Wei, Wei et al., "MAC Protocols for Optical Orthogonal Frequency Division Multiple Access (OFDMA)-based Passive Optical Networks," Optical Fiber Communication/National Fiber Optic Engineers Conference OFC/NFOEC, pp. 1-3 (2008).

*Primary Examiner* — Jay P Patel
(74) *Attorney, Agent, or Firm* — Nelson Mullins Riley & Scarborough LLP; Anthony A. Laurentano, Esq.; Lewis Lee, Esq.

(57) ABSTRACT

A wired/wireless converged media access control (MAC) adaptor and a method for transmitting a frame using the same. The wired/wireless converged MAC adaptor may include a service network interface (SNI) to transmit a MAC frame corresponding to a wired or wireless service, or common public radio interface (CPRI) data, a frame conversion unit to convert, into an orthogonal frequency division multiplexing (OFDM) frame, a wired/wireless converged MAC frame having a common frame structure of the MAC frame corresponding to the wired or wireless service or the CPRI data, and an OFDM interface configured to transmit the OFDM frame to an optical OFDM modem by dynamically allocating subcarriers based on data transmission characteristics.

12 Claims, 10 Drawing Sheets

(56) References Cited

U.S. PATENT DOCUMENTS

| | | |
|---|---|---|
| 2010/0232795 A1 | 9/2010 | Wang et al. |
| 2011/0281530 A1* | 11/2011 | Hazani et al. ................ 455/74.1 |
| 2012/0087664 A1* | 4/2012 | Zhang et al. .................... 398/66 |
| 2013/0045012 A1* | 2/2013 | Kanonakis et al. ............. 398/66 |
| 2014/0056583 A1* | 2/2014 | Giddings et al. ................ 398/44 |

* cited by examiner

WIRED/WIRELESS CONVERGED MAC ADAPTOR AND METHOD OF TRANSMITTING FRAME USING WIRED/WIRELESS CONVERGED MAC ADAPTOR

CROSS-REFERENCE TO RELATED APPLICATION

This application claims the priority benefit of Korean Patent Application No. 10-2011-0147676, filed on Dec. 30, 2011, in the Korean Intellectual Property Office, the disclosure of which is incorporated herein by reference.

BACKGROUND

1. Field of the Invention

The present invention relates to a wired/wireless converged media access control (MAC) adaptor for providing a wired/wireless converged service in a 10 gigabits per second (Gbps) orthogonal frequency division multiple access-passive optical network (OFDMA-PON) and a method of transmitting a frame using the same, and more particularly, to a wired/wireless converged MAC adaptor for enabling packet transmission and reception between a wired/wireless access device and an optical OFDMA-PON and a method of transmitting a frame using the same.

2. Description of the Related Art

A second-generation/third generation (2G/3G)-based wireless access network may provide voice and data services to subscribers between a mobile station controller (MSC) and a base station controller (BSC) using a multichannel E1 (2.048 megabits per second (Mbps)) or 100 Mbps fast Ethernet (FE) technology. However, a recent spread of tablet personal computers (PCs) and smart phones, traffic for a data service in a wireless access network is increasing at a rapid rate. Accordingly, a need to expand a transmission capacity of a wireless access section is inevitable.

To meet this demand, a fourth generation (4G) long-term evolution (LTE) technology for providing a 1 gigabit per second (Gbps) transmission band in a wireless access section has been developed and applied to a wireless access network. LTE devices are connected on a one-to-one network basis between an MSC and a BSC through an optical cable. However, wireless access providers are currently contemplating transmission of gigabit-rate or higher using a one-to-N passive optical network (PON) architecture for a wired access network.

Also, to provide subscribers with a gigabit-capable transmission link for a wired access network, an Ethernet-PON (E-PON) or a gigabit-capable PON (G-PON) based on time division multiple access (TDMA)-PON is being applied. Since a TDMA-PON is a type of time division multiplexing, only a transmission band of 300 Mbps, on average, is guaranteed. However, to provide subscribers with an ultra high definition TV (UHDTV) service and various high quality multimedia services, a 10 Gbps TDMA-PON technology has been recently developed and is being gradually applied to a wired access network.

To date, an orthogonal frequency division multiple (OFDM) technology has been mainly applied to a wired access section. Recently, the institute of electrical and electronics engineers (IEEE) 802.11-based wireless fidelity (Wi-Fi) standard is providing a transmission band of a maximum of 300 Mbps using an OFDM technology, but is mainly used in a near field of tens meters due to limitations on a signal quality and a signal intensity.

Recently, studies have been conducted on an optical OFDMA-PON technology to provide a transmission band of 1 Gbps or higher per subscriber by applying an OFDM technology to a next generation (NG)-PON2. Work on an OFDMA-PON technology is mainly being done through a full service access network (FSAN) forum, and it is expected that the OFDMA-PON technology will be applied to a subscriber network after 2015.

Standards for an NG-PON2 have been developed to provide a 40 Gbps transmission band through one optical distribution network (ODN), and to guarantee access of 64 to 1,000 optical network units (ONUs) and a transmission band of 1 Gbps per subscriber. Currently, as a candidate technology for an NG-PON2, various technologies are under consideration, for example, a wavelength division multiplexing (WDM)-PON technology, an OFDMA-PON technology, a 10 Gbps hybrid PON technology, a 40 Gbps TDMA-PON technology, and the like.

Also, recently a demand for providing a wired/wireless converged service via an all Internet protocol (IP)-based single network is increasing. A wired/wireless converged network provides a seamless service to wired/wireless subscribers by integrating access network devices. Here, an OFDMA-PON technology is a solution suitable for providing a wired/wireless converged service.

An OFDMA-PON may allow a high-capacity transmission service using an ODN for a TDMA-PON and may provide a wired/wireless service for each sub-carrier. That is, an OFDMA-PON may allow a wireless service and a wired service using a single access network. For an OFDMA-PON to allow a wireless service and a wired service using a single access network, a MAC adaptor for transmission between an existing wired/wireless access device and the OFDMA-PON is required.

SUMMARY

An aspect of the present invention provides a wired/wireless converged media access control (MAC) adaptor for providing a wired/wireless converged service in a single access network for a gigabit-capable orthogonal frequency division multiple access-passive optical network (OFDMA-PON), and a method for transmitting a frame using the same.

Another aspect of the present invention also provides a wired/wireless converged MAC adaptor for transmitting a single converged MAC frame including wired/wireless data to an OFDM sub-carrier without a separate additional overhead by providing an Ethernet interface and a common public radio interface (CPRI) for matching a wired/wireless network, and a method for transmitting a frame using the same.

Still another aspect of the present invention may provide, through an OFDM mapper, information about a start and an end of an OFDM frame, monitor a bit error rate (BER) of an OFDM link using bit-interleaved parity (BIP), and monitor and efficiently manage an OFDM link using real-time alarm information.

According to an aspect of the present invention, there is provided a wired/wireless converged MAC adaptor including a service network interface (SNI) to transmit a MAC frame corresponding to a wired or wireless service, or CPRI data, a frame conversion unit to convert, into an OFDM frame, a wired/wireless converged MAC frame having a common frame structure of the MAC frame corresponding to the wired or wireless service or the CPRI data, and an OFDM interface to transmit the OFDM frame to an optical OFDM modem by dynamically allocating sub-carriers based on data transmission characteristics.

According to another aspect of the present invention, there is provided a wired/wireless converged MAC adaptor including an OFDM interface to receive an OFDM frame from an optical OFDM modem, a frame conversion unit to convert the OFDM frame into a MAC frame corresponding to a wired or wireless service, and an SNI to output the converted MAC frame corresponding to the wired or wireless service, or CPRI data.

According to still another aspect of the present invention, there is provided a method of transmitting a frame using a wired/wireless converged MAC adaptor, the method including transmitting a MAC frame corresponding to a wired or wireless service, or CPRI data, converting, into an OFDM frame, a wired/wireless converged MAC frame having a common frame structure of the MAC frame corresponding to the wired or wireless service or the CPRI data, and transmitting the OFDM frame to an optical OFDM modem by dynamically allocating sub-carriers based on data transmission characteristics.

According to yet another aspect of the present invention, there is provided a method of transmitting a frame using a wired/wireless converged MAC adaptor, the method including receiving an OFDM frame from an optical OFDM modem, converting the OFDM frame into a MAC frame corresponding to a wired or wireless service, and outputting the converted MAC frame corresponding to the wired or wireless service.

According to further another aspect of the present invention, there is provided a method of allocating sub-carriers using a wired/wireless converged MAC adaptor, the method including receiving sub-carrier control information including at least one of a traffic rate associated with data transmission characteristics and status of a receive queue of an optical network unit (ONU), and dynamically allocating sub-carriers for transmitting an OFDM frame using the sub-carrier control information.

According to still another aspect of the present invention, there is provided a recording medium readable by a computer recording an OFDM frame transmitted and received by a wired/wireless converged MAC adaptor, the OFDM frame generated based on a wired/wireless converged MAC frame converted from a MAC frame corresponding to a wired or wireless service, by adding, to the wired/wireless converged MAC frame, an overhead including at least one of delimiter information indicating a start and an end of a frame, a BIP field, a sub-carrier number, alarm indicator information indicating status of an optical line terminal (OLT) and an ONU, and OFDM status indication information.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
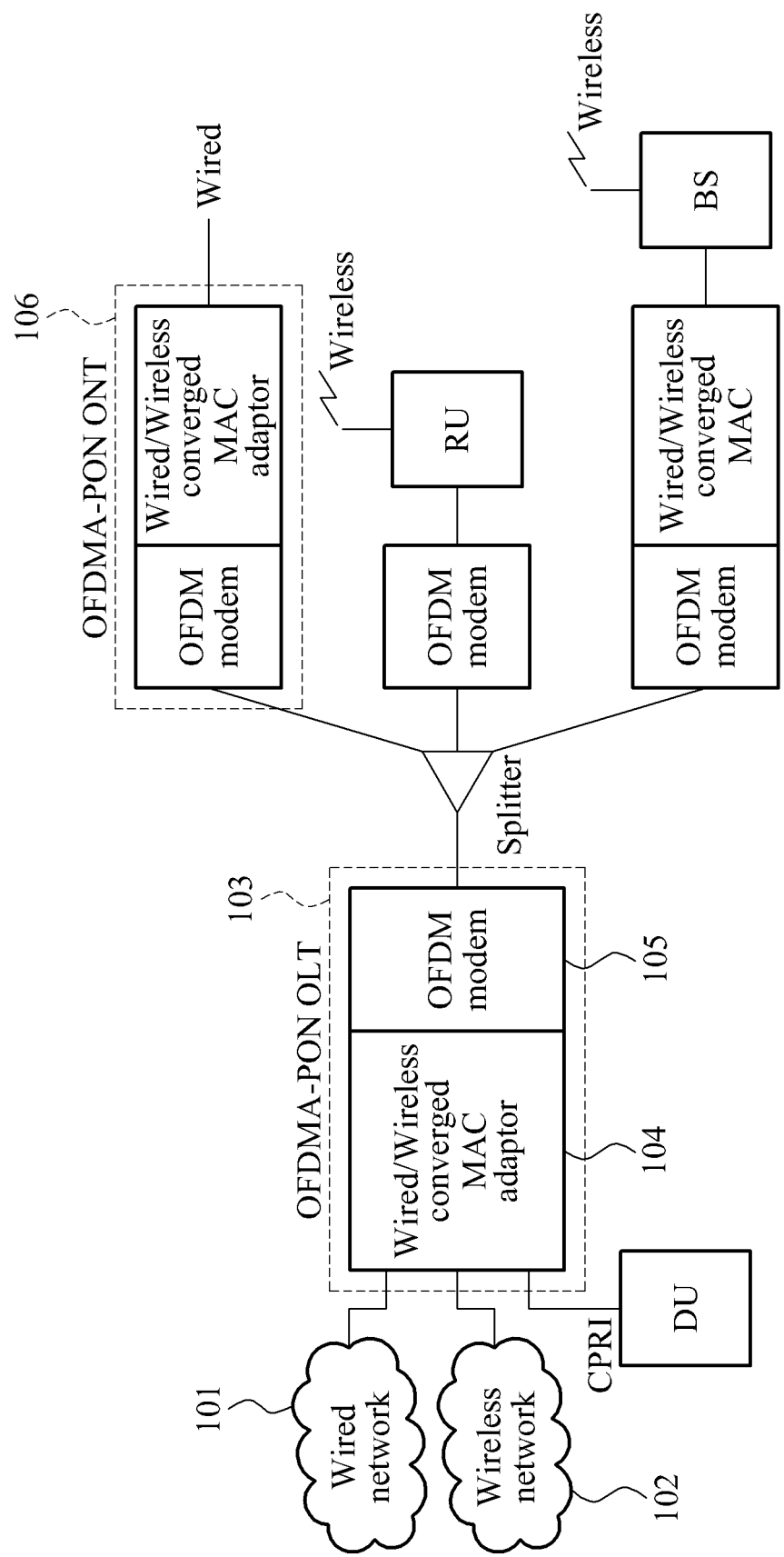
FIG. 1 is a diagram illustrating an orthogonal frequency division multiple access-passive optical network access (OFDMA-PON) topology to which a wired/wireless converged media access control (MAC) adaptor is applied, according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating an orthogonal frequency division multiple access-passive optical network access (OFDMA-PON) topology to which a wired/wireless converged media access control (MAC) adaptor 104 is applied, according to an embodiment of the present invention.

As shown in FIG. 1, the wired/wireless converged MAC adaptor 104 may be present in an optical line terminal (OLT) 103 and an optical network terminal (ONT) 106 of the OFDMA-PON. In OLT 103, the wired/wireless converged MAC adaptor 104 may provide a matching function between a service network including a wired service network 101 and a wireless service network 102 and an optical OFDM modem 105 for the OFDMA-PON. In the ONT 106, the wired/wireless converged MAC adaptor 104 may provide a matching function between the OFDM modem 105 and a subscriber interface.

FIG. 1 illustrates a structure for providing a wired/wireless converged service using an OFDMA-PON in a case in which the wired service network 101 and the wireless service network 102 are present separately. A MAC frame transmitted via the wired service network 101 or the wireless service network 102 may be encapsulated through the wired/wireless converged MAC adaptor 104, and may be transmitted through the optical OFDM modem 105. The MAC frame may be separated through an optical OFDM modem and a wired/wireless converged MAC adaptor in the ONT 106 of the OFDMA-PON.

A digital unit (DU) and a radio unit (RU) for a common public radio interface (CPRI) may be connected through the wired/wireless converged MAC adaptor 104 and the optical OFDM modem 105, or may be connected directly through the OFDMA-PON alone.

Accordingly, the OFDM-PON topology according to an embodiment of the present invention may provide a wired/ wireless converged service using an optical distribution network (ODN) installed in an existing subscriber network.

Figure 2:
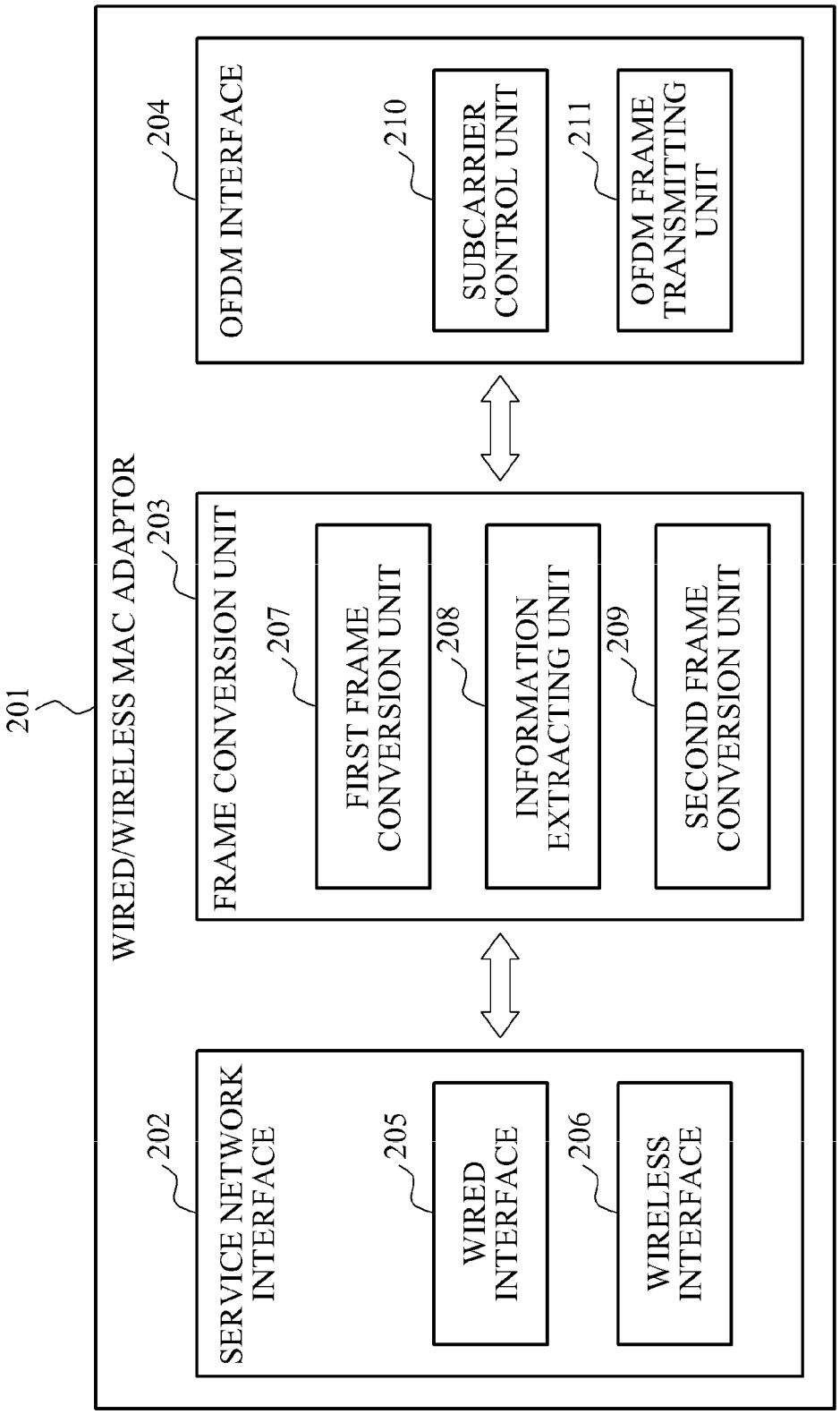
FIG. 2 is a block diagram illustrating a wired/wireless converged MAC adaptor according to an embodiment of the present invention.

FIG. 2 is a block diagram illustrating a wired/wireless converged MAC adaptor 201 according to an embodiment of the present invention.

Referring to FIG. 2, the wired/wireless converged MAC adaptor 201 may include a service network interface (SNI) 202, a frame conversion unit 203, and an OFDM interface 204. Here, the SNI 202 may include a wired interface 205 and a wireless interface 206. The frame conversion unit 203 may include a first frame conversion unit 207, an information extracting unit 208, and a second frame conversion unit 209. The OFDM interface 204 may include a sub-carrier control unit 210 and an OFDM frame transmitting unit 211.

Hereinafter, a description of the wired/wireless converged MAC adaptor 201 for downstream frame transmission is provided.

The wired interface 205 may be connected to a wired service network to transmit a MAC frame corresponding to a wired service to the frame conversion unit 203. The wireless interface 206 may be connected to a wireless service network to transmit a MAC frame corresponding to a wireless service to the frame conversion unit 203.

The first frame conversion unit 207 may convert a MAC frame corresponding to a wired or wireless service into a wired/wireless converged MAC frame. The first frame conversion unit 207 may convert a MAC frame corresponding to a wired or wireless service into a wired/wireless converged MAC frame by adding, to the MAC frame corresponding to the wired or wireless service, an overhead including payload length information, sub-carrier information, OFDM interface port information, type information of a frame inputted, and error correction information.

The information extracting unit 208 may extract sub-carrier information for transmitting an OFDM frame from a wired/wireless converged MAC frame. In this instance, the information extracting unit 208 may extract sub-carrier information and OFDM interface port information using a hash value included in an overhead of a wired/wireless converged MAC frame.

The second frame conversion unit 208 may convert a wired/wireless converged MAC frame into an OFDM frame including sub-carrier information. For example, the second frame conversion unit 208 may convert a wired/wireless converged MAC frame into an OFDM frame by adding, to the wired/wireless converged MAC frame, an overhead including at least one of delimiter information indicating a start and an end of a frame, a bit-interleaved parity (BIP) field, a sub-carrier number, alarm indicator information indicating a status of an optical line terminal (OLT) and an optical network unit (ONU), and OFDM status indication information.

The sub-carrier control unit 210 may generate sub-carrier control information by monitoring data transmission characteristics. Here, the data transmission characteristics may include a traffic rate and status of a receive queue.

The OFDM frame transmitting unit 211 may transmit an OFDM frame through a dynamically allocated sub-carrier based on sub-carrier control information.

Hereinafter, a description of the wired/wireless converged MAC adaptor 201 for upstream frame transmission is provided.

The wired/wireless converged MAC adaptor 201 may include the OFDM interface 204, the frame conversion unit 203, and the SNI 202.

The OFDM interface 204 may receive an OFDM frame from the optical OFDM modem.

The frame conversion unit 203 may convert an OFDM frame into a MAC frame corresponding to a wired or wireless service. The frame conversion unit 203 may include the first frame conversion unit 207 and the second frame conversion unit 209.

The first frame conversion unit 207 may convert an OFDM frame into a wired/wireless converged MAC frame having a common frame structure of a MAC frame corresponding to a wired or wireless service.

The second frame conversion unit 209 may convert a wired/wireless converged MAC frame into a MAC frame corresponding to a wired or wireless service using overhead information of the wired/wireless converged MAC frame.

The SNI 202 may output a converted MAC frame corresponding to a wired or wireless service. In this instance, the SNI 202 may output a MAC frame corresponding to a wired or wireless service using sub-carrier information, source address (SA) information, and input port information of an OFDM frame.

Figure 3:
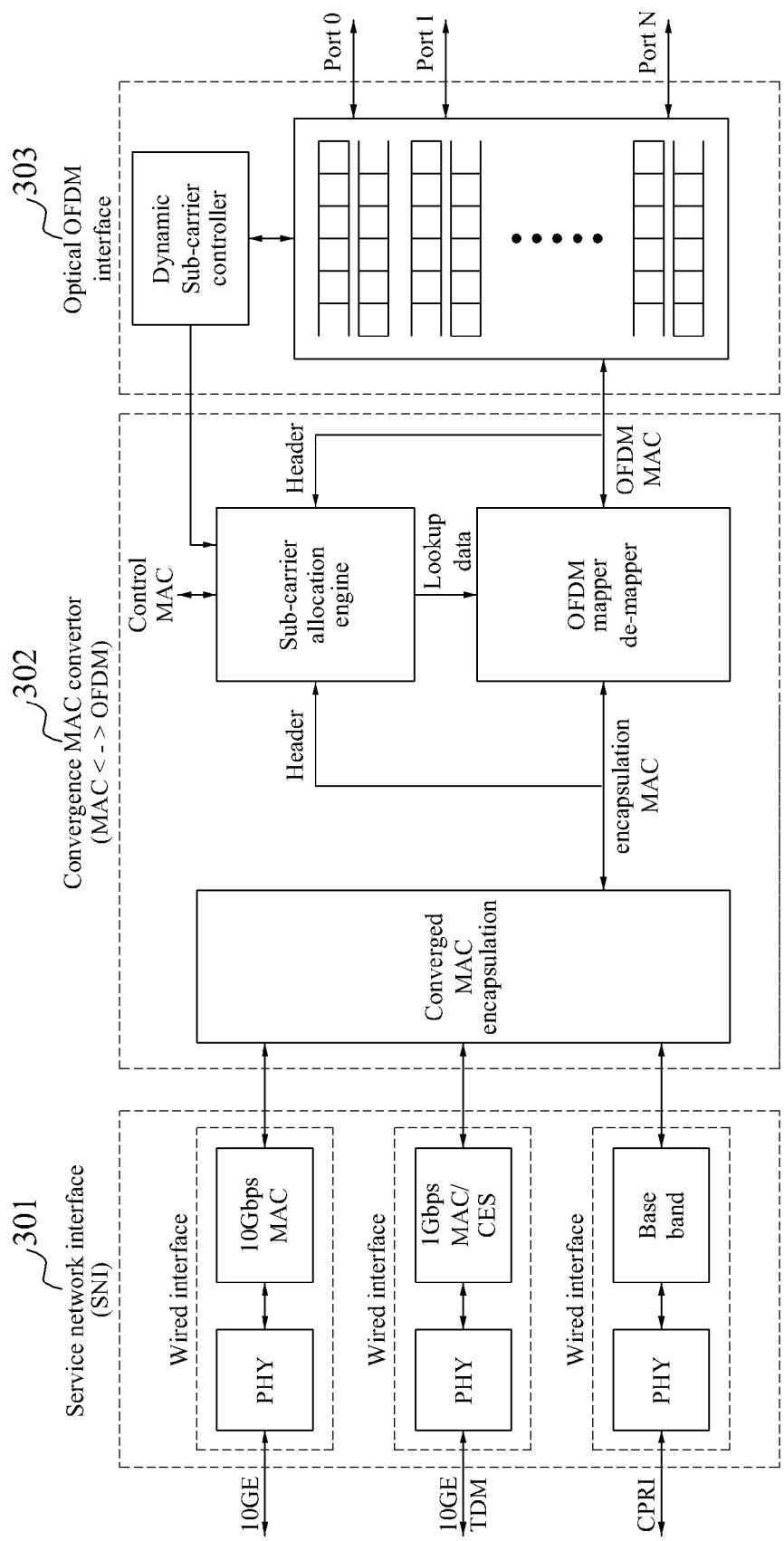
FIG. 3 is a diagram illustrating a detailed configuration of FIG. 2 according to an embodiment of the present invention.

FIG. 3 is a diagram illustrating a detailed configuration of FIG. 2 according to an embodiment of the present invention.

As shown in FIG. 3, a wired/wireless converged MAC adaptor 302 may include an SNI 301, a converged MAC converter 302 corresponding to the frame conversion unit of FIG. 2, and an optical OFDM interface 303.

The SNI 301 may include a 10 gigabits per second (Gbps) wired interface for matching a wired service network, and a 1 Gbps wired interface or a circuit emulation service (CES) block for matching a wireless service network. Also, the SNI 301 may include a wireless interface for matching a DU of a CPRI. Here, the wireless interface may use a CES for matching a second generation/third generation (2G)/(3G) network and may use a gigabit Ethernet (GE) for matching a fourth generation (4G) network. Accordingly, the wired/wireless converged MAC adaptor 302 according to an embodiment of the present invention may be easily applied to a network for a wired/wireless converged service since the adaptor 302 provides both a wired service and a wireless service.

The converged MAC converter 302 may include a converged MAC encapsulation block, a sub-carrier allocation engine, and an OFDM mapper/de-mapper.

The converged MAC encapsulation block may convert a wired MAC frame transmitted through a wired interface, a wireless MAC frame transmitted through a wireless interface, and a baseband signal of a CPRI into a wired/wireless converged MAC frame having a common frame structure. In FIG. 3, an encapsulated MAC frame may correspond to a wired/wireless converged MAC frame.

The sub-carrier allocation engine may output lookup data including sub-carrier information and OFDM interface information using a hash value of a wired/wireless converged MAC frame generated by the converged MAC encapsulation block. Here, the hash value may be calculated using a destination address (DA) or virtual local area network (VLAN) information of an Ethernet MAC frame.

The OFDM mapper/de-mapper may convert a wired/wireless converged MAC frame into an OFDM MAC frame. In this instance, the OFDM mapper may add, to a header of an OFDM MAC frame, at least one of delimiter information, BIP information, alarm information, OFDM link management information, and the like.

The optical OFDM interface 303 may provide a function for matching an optical OFDM modem, and may form a number of transmit and receive queues equal to a number of ONTs. Through transmit and receive queues, traffic of a plurality of sub-carriers may be transmitted. A dynamic sub-carrier controller may control usage of the sub-carriers based on a traffic status of transmit and receive queues and sub-carrier control information transmitted from the ONUs.

Figure 4:
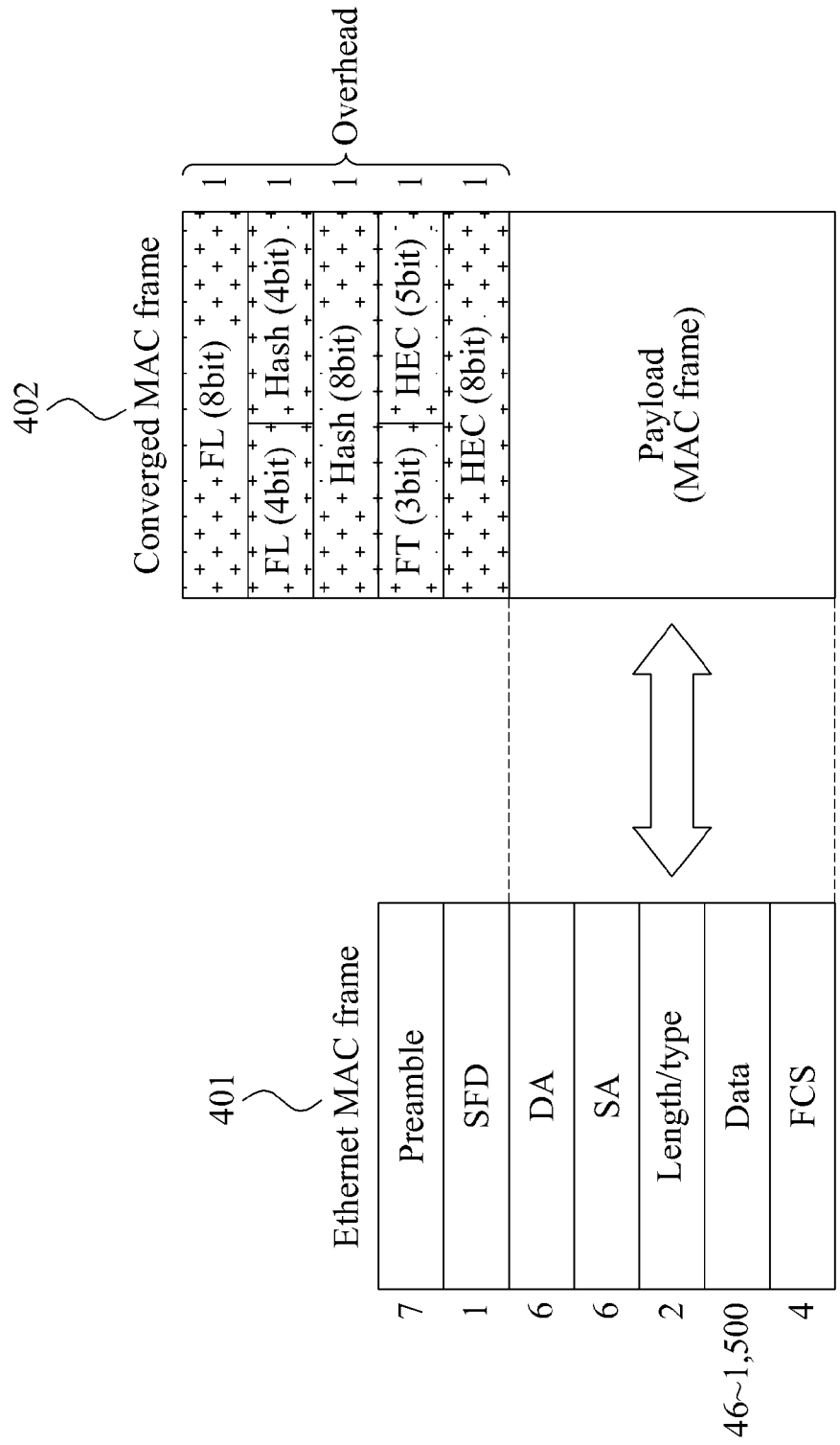
FIG. 4 is a diagram illustrating conversion of an Ethernet MAC frame for a wired service into a wired/wireless converged MAC frame according to an embodiment of the present invention.

FIG. 4 is a diagram illustrating conversion of an Ethernet MAC frame 401 for a wired service into a wired/wireless converged MAC frame 402 according to an embodiment of the present invention.

Referring to FIG. 4, the wired/wireless converged MAC frame 402 may largely include a 5 bytes header and a 4,096 bytes payload, similar to a gigabit-capable PON encapsulation method (GEM) frame.

Each time the Ethernet MAC frame 401 transmits one frame, the Ethernet MAC frame 401 may use a 12 byte inter frame gap (IFG), a 7 bytes preamble, and a 1 byte starting frame delimiter (SFD), as an overhead. The wired/wireless converged MAC adaptor may remove an overhead of 20 bytes from the Ethernet MAC frame 401, and may load DA, SA, length/type, data, a frame check sequence (FCS) used in the Ethernet MAC frame 401 into the payload of the wired/wireless converged MAC frame 402. Also, the wired/wireless converged MAC adaptor may add another overhead of 5 bytes to the Ethernet MAC frame 401.

Accordingly, the present invention may provide the wired/wireless converged MAC frame 402 without an overhead causing an increase in size of a frame inputted. A frame length (FL) included in the overhead of the wired/wireless converged MAC frame 402 may refer to a payload length in byte transmitted through the wired/wireless converged MAC frame 402. Using the FL, an end of the wired/wireless converged MAC frame 402 may be found. A hash value may be generated through a hash function using the DA of the Ethernet MAC frame 401, or may be calculated through VLAN information. The hash value may be used in finding sub-carrier information. In a case of a 12 bits hash value, a total of 4,096 lookup tables may be managed.

A frame type (FT) may refer to a type of a frame inputted. That is, the FT may be used to determine whether the wired/wireless converged MAC frame 402 is a MAC frame corresponding to a wired or wireless service or CPRI data. Also, the FT may be used to determine a port of an SNI. Header error correction (HEC) may provide a 2-bit error correction function for header information. The overhead of 5 bytes included in the wired/wireless converged MAC frame 402 may be further expanded within a range of 20 bytes.

Figure 5:
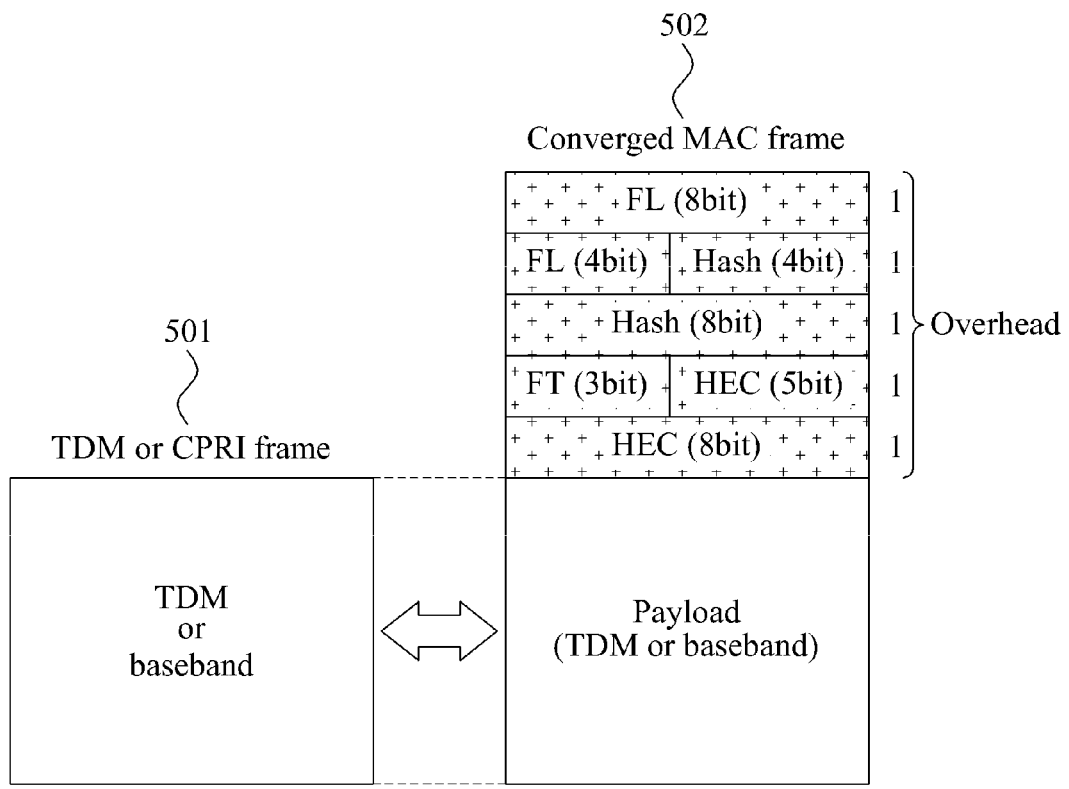
FIG. 5 is a diagram illustrating conversion of a time division multiplexing (TDM) or common public radio interface (CPRI) frame into a wired/wireless converged MAC frame according to an embodiment of the present invention.

FIG. 5 is a diagram illustrating conversion of a time division multiplexing (TDM) or common public radio interface (CPRI) frame 501 into a wired/wireless converged MAC frame 502 according to an embodiment of the present invention.

Referring to FIG. 5, a payload of the wired/wireless converged MAC frame 502 may include a TDM packet and a baseband signal of a CPRI. In this instance, a FT included in an overhead of the wired/wireless converged MAC frame 502 may indicate whether a payload type of the wired/wireless converged MAC frame 502 is TDM or CPRI. The baseband signal of the CPRI may be transmitted directly through an allocated sub-carrier without passing through a wired/wireless converged MAC adaptor.

The overhead of the wired/wireless converged MAC frame 502 of FIG. 5 is similar to that of FIG. 4, and thus a detailed description is omitted for conciseness.

Figure 6:
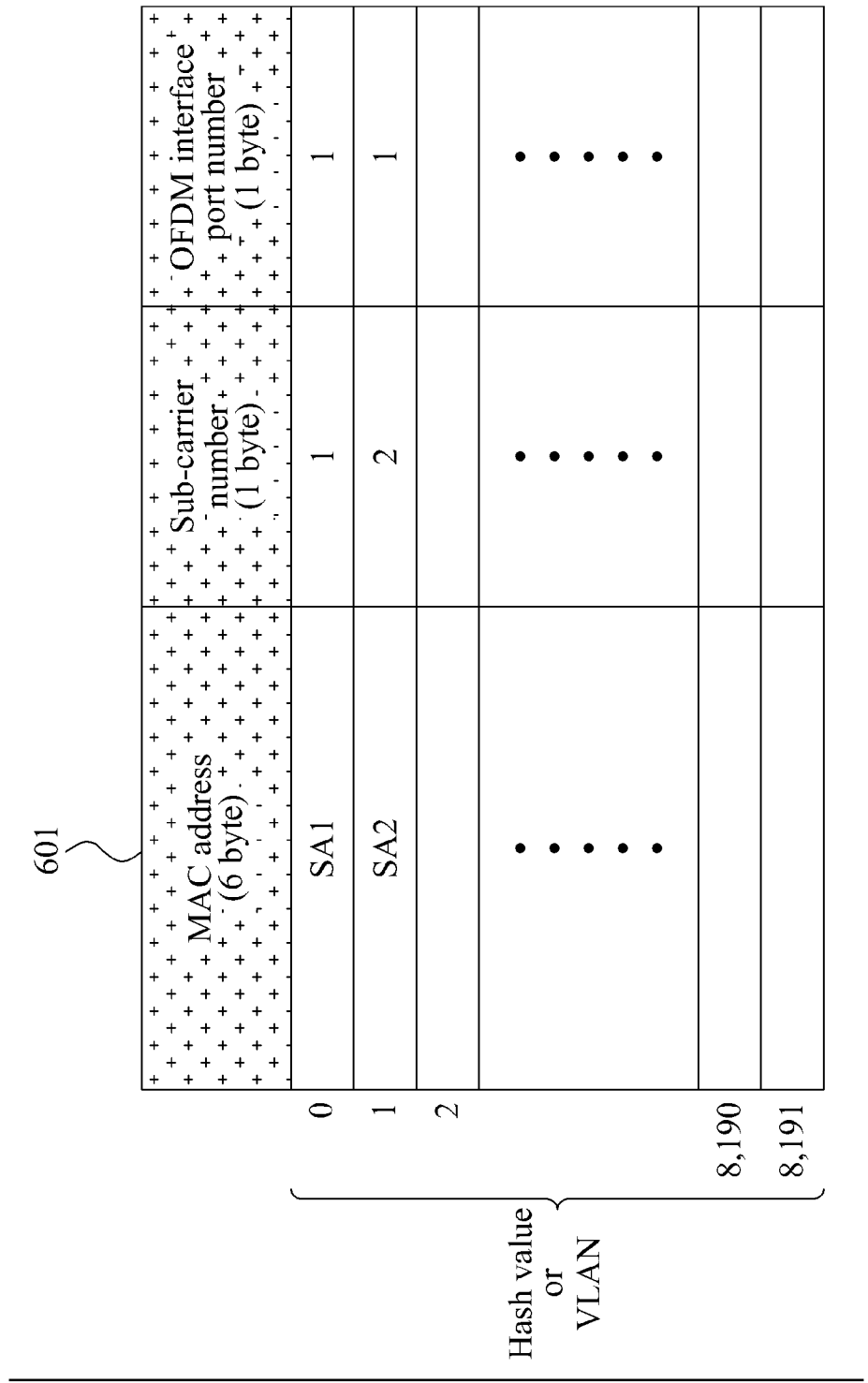
FIG. 6 is a diagram illustrating an example of a lookup table used for dynamic sub-carrier allocation according to an embodiment of the present invention.

FIG. 6 is a diagram illustrating an example of a lookup table used for dynamic sub-carrier allocation according to an embodiment of the present invention.

As shown in FIG. 6, a wired/wireless converged MAC adaptor may find sub-carrier information and OFDM interface port information based on an address of a wired/wireless converged MAC frame. For example, the wired/wireless converged MAC adaptor may extract parameters stored in an address of the wired/wireless converged MAC frame using a hash value included in an overhead of the wired/wireless converged MAC frame. A size of a lookup table used in dynamically allocating a sub-carrier may be determined based on the hash value.

Referring to FIG. 6, the wired/wireless converged MAC adaptor may store, in a hash value address generated using an SA, a MAC address as an SA included in a header of an OFDM frame transmitted from an OFDM interface, a sub-carrier number as sub-carrier information stored in the overhead, and an OFDM interface port number as OFDM interface port information. One piece of OFDM interface port information may be used for a plurality of sub-carriers.

Figure 7:
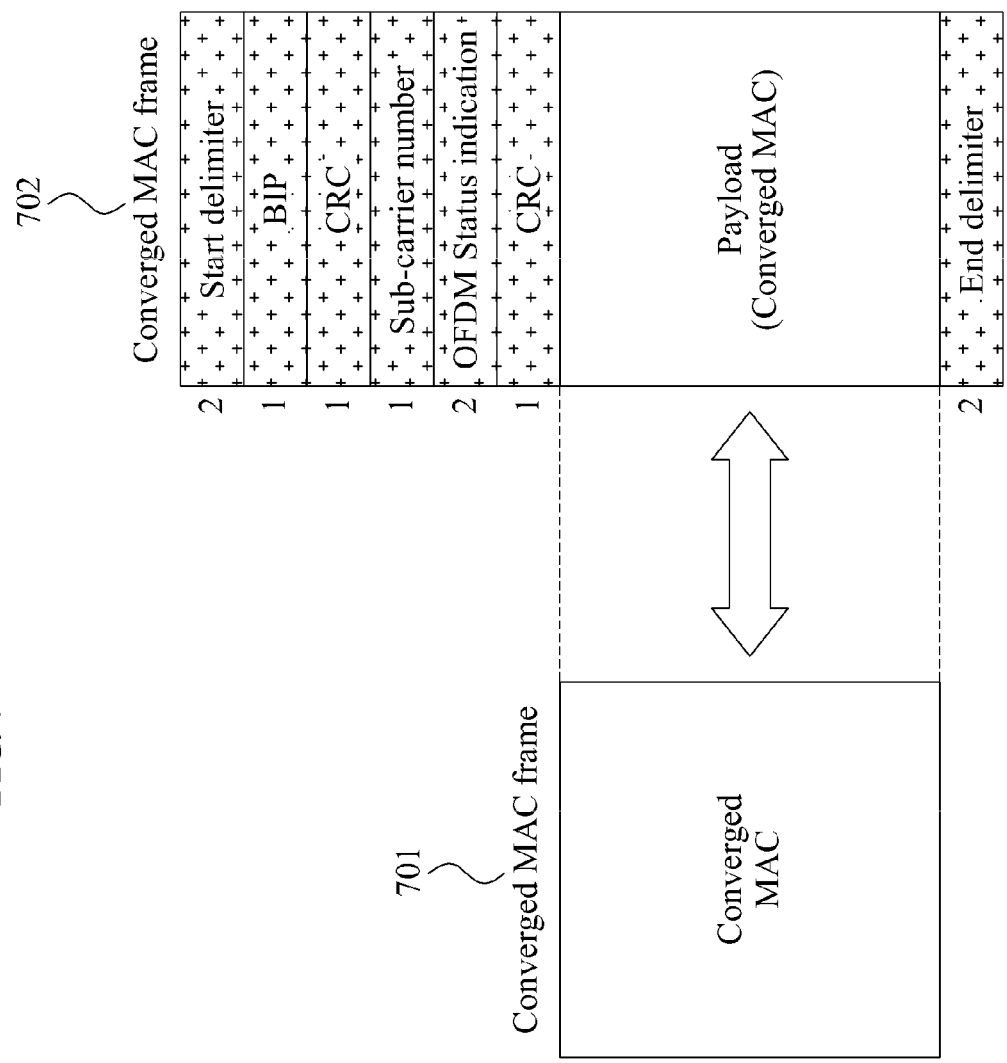
FIG. 7 is a diagram illustrating conversion of a wired/wireless converged MAC frame into an OFDM frame according to an embodiment of the present invention.

FIG. 7 is a diagram illustrating conversion of a wired/wireless converged MAC frame 701 into an OFDM frame 702 according to an embodiment of the present invention.

Referring to FIG. 7, a wired/wireless converged MAC adaptor may convert a wired/wireless converged MAC frame 701 into the OFDM frame 702 by adding a 10 byte overhead to the wired/wireless converged MAC frame 701. The overhead may include a start delimiter, an end delimiter, BIP, a sub-carrier number, alarm indication, OFDM status indication, and cyclic redundancy check (CRC).

For example, the wired/wireless converged MAC adaptor may add a 2 byte start delimiter and a 2 byte end delimiter to a start and an end of the OFDM frame 702, respectively. An optical OFDM modem may find the OFDM frame 702 using the delimiter. Here, the delimiter may have an arbitrary value.

The BIP may store a value calculated by exclusive-ORing (XORing) a sub-carrier number, alarm indication, OFDM status indication, CRC, and a payload in a previous OFDM frame. The BIP may be used in measuring a BER of an OFDM link. The sub-carrier number may be used for the optical OFDM modem to transmit an OFDM frame for each sub-carrier.

The alarm indication may display alarm information of various links in a bitmap format. Through the alarm indication, an OLT and an ONU of an OFDMA-PON may obtain status information of one another. The alarm indication may include a loss of signal (LOS), a bit error rate (BER), remote defect indication (RDI), transmitter failure (TF), and the like.

The OFDM status indication may refer to information for control and setting between OFDM modems. The OFDM status indication may correspond to a parameter between modems of an OLT and an ONU. For example, the OFDM status indication may include management information used in an OFDM modem, for example, an OFDM modulation method, an FEC mode, a sub-carrier request/response mode, status of a receive queue, and the like.

Figure 8:
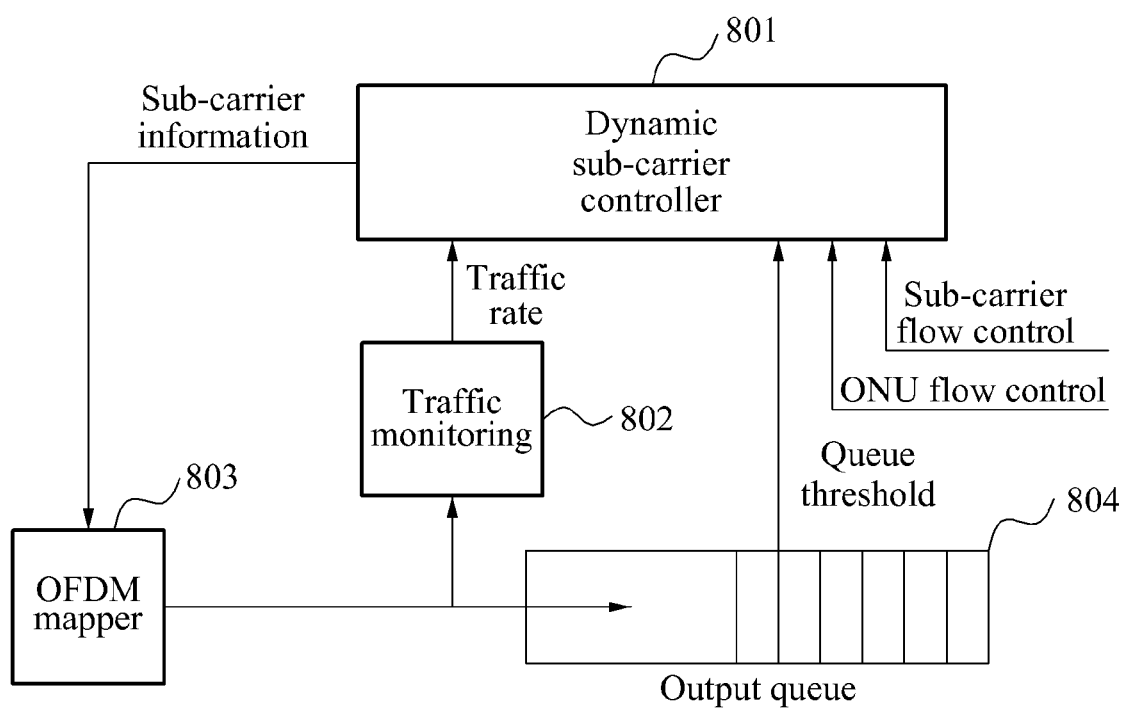
FIG. 8 is a diagram illustrating dynamic sub-carrier allocation according to an embodiment of the present invention.

FIG. 8 is a diagram illustrating dynamic sub-carrier allocation according to an embodiment of the present invention.

The elements of FIG. 8 may be included in a wired/wireless converged MAC adaptor. As shown in FIG. 8, a dynamic sub-carrier controller block 801 may receive sub-carrier control information including a traffic rate, a queue threshold, a flow control, and status of a receive queue of an ONU, from a traffic monitoring block 802.

The traffic rate may correspond to an amount of traffic transmitted per port. The dynamic sub-carrier controller block 801 may dynamically use a sub-carrier using the traffic rate. For example, when the traffic rate is increased, the dynamic sub-carrier controller block 801 may increase a number of sub-carriers to be used, and when the traffic rate is reduced, the dynamic sub-carrier controller block 801 may reduce a number of sub-carriers to be used.

The queue threshold may correspond to a traffic occupying state of a queue for each output port. When a status of the queue exceeds the queue threshold, the dynamic sub-carrier controller block 801 may transmit a packet through another sub-carrier, and when the status of the queue fails to exceed the queue threshold, the dynamic sub-carrier controller block 801 may transmit a packet through an original sub-carrier.

Also, the dynamic sub-carrier controller block 801 may dynamically use a sub-carrier in accordance with sub-carrier flow control or ONU flow control transmitted based on status of a queue 804 for each sub-carrier within an OFDM modem. The dynamic sub-carrier controller block 801 may transmit sub-carrier information not used in each port to an OFDM mapper 803 using sub-carrier flow control or ONU flow control.

The OFDM mapper 803 may transmit an OFDM frame using newly allocated sub-carrier information in lieu of original sub-carrier information. The dynamic sub-carrier controller block 801 may manage an active sub-carrier and an idle sub-carrier. That is, the dynamic sub-carrier controller block 801 may provide a high transmission performance by dynamically managing a sub-carrier allocated to each port based on transmission characteristics.

Figure 9:
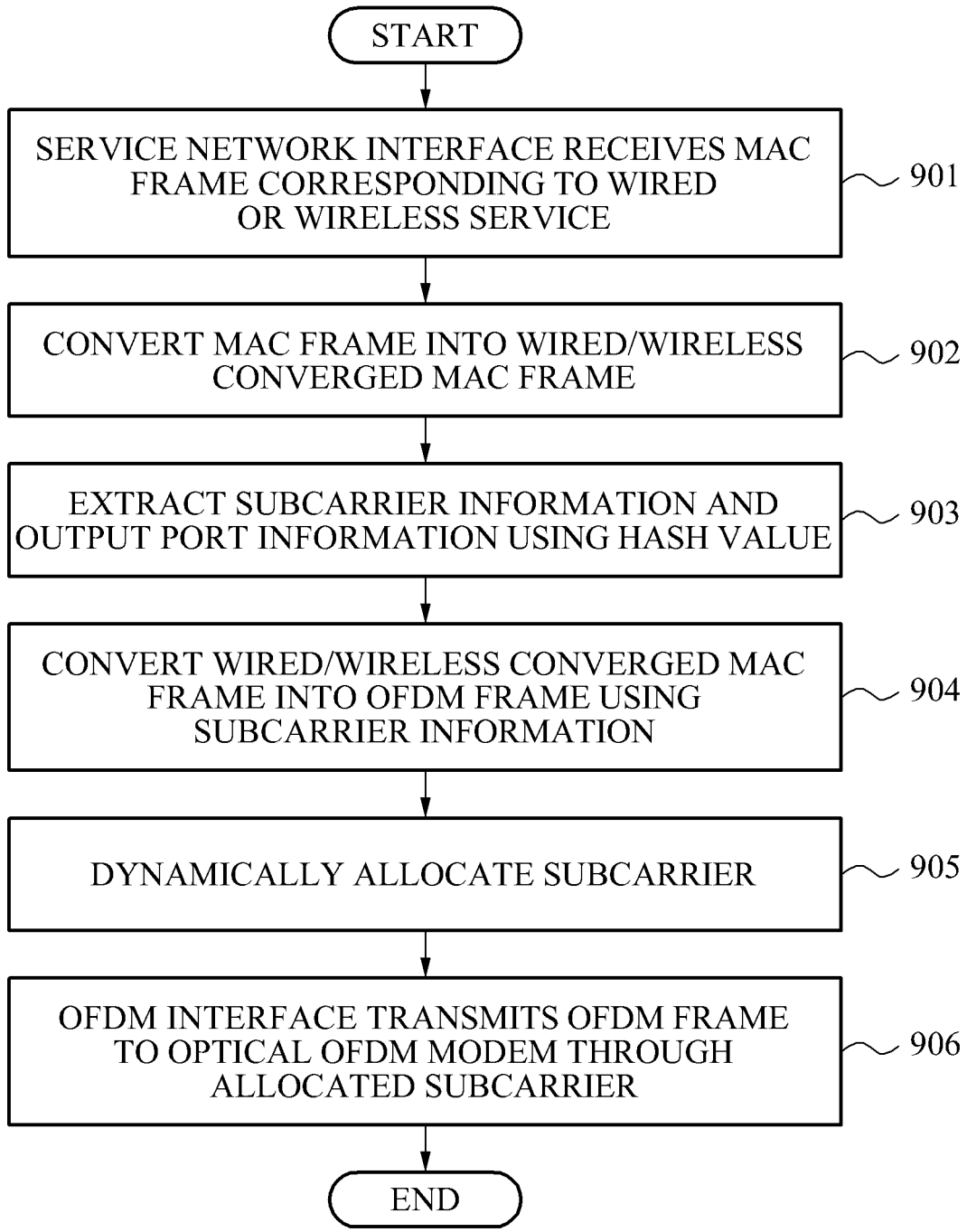
FIG. 9 is a flowchart illustrating a method of transmitting a downstream frame through a wired/wireless converged MAC adaptor according to an embodiment of the present invention.

FIG. 9 is a flowchart illustrating a method of transmitting a downstream frame through a wired/wireless converged MAC adaptor according to an embodiment of the present invention.

In operation 901, an SNI of the wired/wireless converged MAC adaptor may receive and transmit a MAC frame corresponding to a wired or wireless service. For example, the wired/wireless MAC frame and CPRI data may be inputted in the SNI of the wired/wireless converged MAC adaptor.

In operation 902, the wired/wireless converged MAC adaptor may convert the MAC frame corresponding to the wired or wireless service into a wired/wireless converged MAC frame having a common frame structure. For example, the wired/wireless converged MAC adaptor may convert the MAC frame corresponding to the wired or wireless service into the wired/wireless converged MAC frame by adding, to the MAC frame corresponding to the wired or wireless service, an overhead of 5 bytes including payload length information, sub-carrier information, OFDM interface port information, type information of a frame inputted, and error correction information.

In operation 903, the wired/wireless converged MAC adaptor may extract the sub-carrier information and the output port information using a hash value of the wired/wireless converged MAC frame.

In operation 904, the wired/wireless converged MAC adaptor may convert the wired/wireless converged MAC frame into an OFDM frame using the sub-carrier information. For example, the wired/wireless converged MAC adaptor may convert the wired/wireless converged MAC frame into the OFDM frame by adding, to the wired/wireless converged MAC frame, an overhead of 10 bytes including delimiter information indicating a start and an end of a frame, a BIP field, a sub-carrier number, alarm indicator information indicating a status of an OLT and an ONU, and OFDM status indication information.

In operation 905, the wired/wireless converged MAC adaptor may dynamically allocate sub-carriers to transmit the OFDM frame. For example, the wired/wireless converged MAC adaptor may generate sub-carrier control information by monitoring data transmission characteristics, and may dynamically allocate sub-carriers based on the sub-carrier control information.

In operation 906, an OFDM interface of the wired/wireless converged MAC adaptor may transmit the OFDM frame to an optical OFDM modem. For example, the OFDM interface of the wired/wireless converged MAC adaptor may output the OFDM frame based on a priority determined using a quality of service (QoS) parameter through a queue for each output port.

Figure 10:
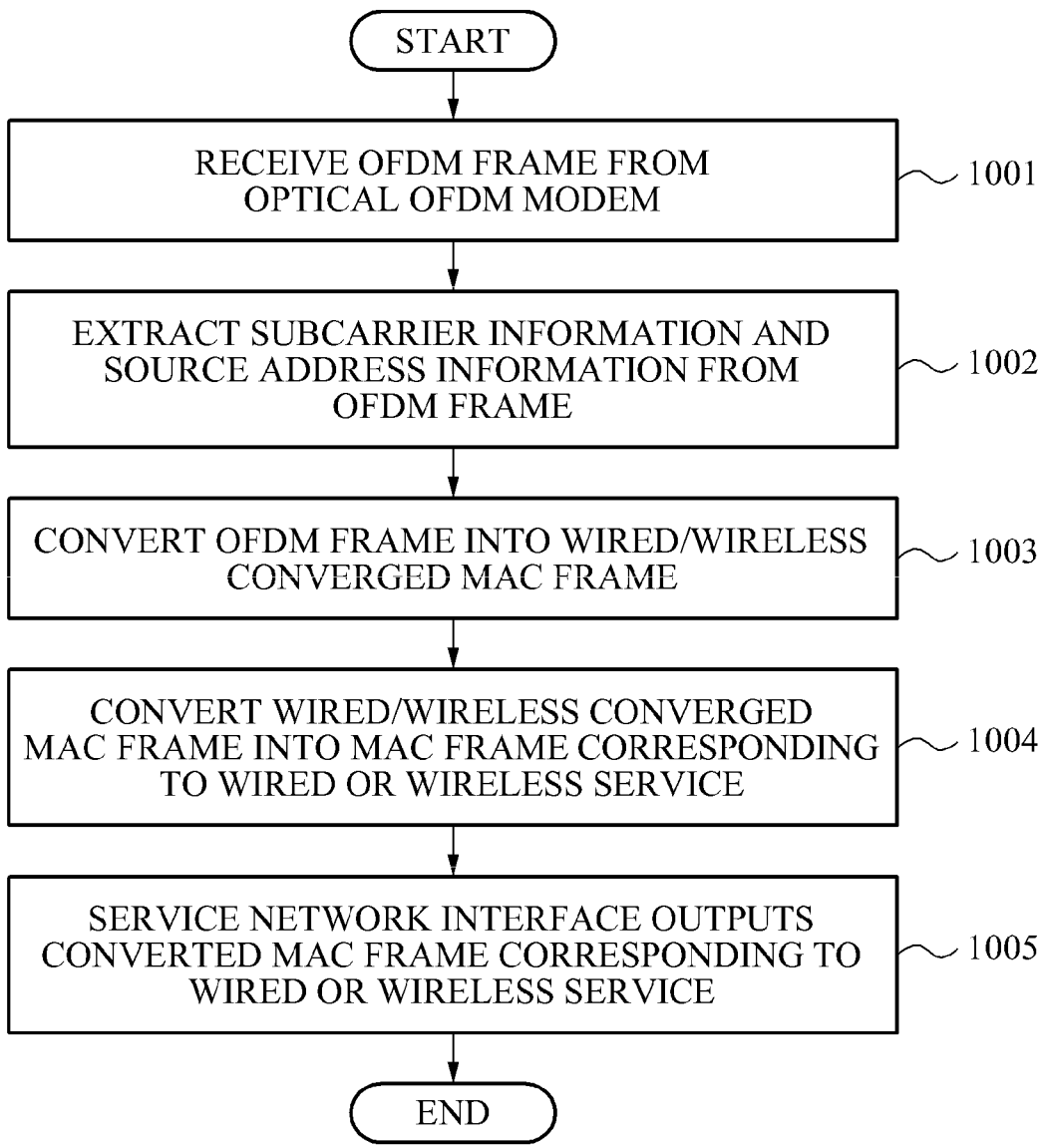
FIG. 10 is a flowchart illustrating a method of transmitting an upstream frame through a wired/wireless converged MAC adaptor according to an embodiment of the present invention.

FIG. 10 is a flowchart illustrating a method of transmitting an upstream frame through a wired/wireless converged MAC adaptor according to an embodiment of the present invention.

In operation 1001, an OFDM interface of the wired/wireless converged MAC adaptor may receive an OFDM frame from an optical OFDM modem.

In operation 1002, the wired/wireless converged MAC adaptor may extract sub-carrier information and source address information from the OFDM frame. Also, the wired/wireless converged MAC adaptor may control an OFDM link using alarm information and OFDM status information included in header information of the OFDM frame.

In operation 1003, the wired/wireless converged MAC adaptor may convert the OFDM frame into a wired/wireless converged MAC frame. For example, the wired/wireless converged MAC adaptor may convert the OFDM frame into the wired/wireless converged MAC frame by removing an overhead from the OFDM frame.

In operation 1004, the wired/wireless converged MAC adaptor may convert the overhead of the wired/wireless converged MAC frame into a MAC frame corresponding to a wired or wireless service, or CPRI data, by removing the overhead of the wired/wireless converged MAC frame.

In operation 1005, an SNI of the wired/wireless converged MAC adaptor may output the MAC frame corresponding to the wired or wireless service, or the CPRI data.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard discs, floppy discs, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

According to the embodiments of the present invention, application to a subscriber network using an OFDMA-PON may allow transmission of a wired/wireless frame via an OFDM link without an additional overhead.

According to the embodiments of the present invention, transmission efficiency may be improved by dynamically allocating a sub-carrier based on various control status.

According to the embodiments of the present invention, an OFDM link between an OLT and an ONU may be efficiently managed by adding alarm information and OFDM information to an OFDM frame.

A method of transmitting a frame using a wired/wireless converged media access control (MAC) adaptor, the method comprising: receiving an orthogonal frequency division multiplexing (OFDM) frame from an optical OFDM modem; converting the OFDM frame into a MAC frame corresponding to a wired or wireless service, or common public radio interface (CPRI) data; and outputting the converted MAC frame corresponding to the wired or wireless service.

The converting of the OFDM frame into the MAC frame corresponding to the wired or wireless service, or the CPRI data comprises: converting the OFDM frame into a wired/wireless converged MAC frame comprising a common frame structure of the MAC frame corresponding to the wired or wireless service or the CPRI data; and converting the wired/wireless converged MAC frame into the MAC frame corresponding to the wired or wireless service, or the CPRI data using overhead information of the wired/wireless converged MAC frame.

A method of allocating sub-carriers using a wired/wireless converged media access control (MAC) adaptor, the method comprising: receiving sub-carrier control information including at least one of a traffic rate associated with data transmission characteristics and status of a receive queue of an optical network unit (ONU); and dynamically allocating sub-carriers for transmitting an orthogonal frequency division multiplexing (OFDM) frame using the sub-carrier control information.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A wired/wireless converged media access control (MAC) adaptor comprising:
 a service network interface (SNI) to transmit a MAC frame corresponding to a wired or wireless service, or common public radio interface (CPRI) data;
 a frame conversion unit to convert a wired/wireless converged MAC frame comprising a common frame structure of the MAC frame or the CPRI data, into an orthogonal frequency division multiplexing (OFDM) frame; and
 an OFDM interface to transmit the OFDM frame to an optical OFDM modem by dynamically allocating sub-carriers based on data transmission characteristics,
 wherein the frame conversion unit comprises:
 a first frame conversion unit to convert the MAC frame or the CPRI data into the wired/wireless converged MAC frame, using an overhead including at least one of payload length information, sub-carrier information, OFDM interface port information, type information of a frame inputted, and error correction information;
 an information extracting unit to extract sub-carrier information for transmitting the OFDM frame from the wired/wireless converged MAC frame; or
 a second frame conversion unit to convert the wired/wireless converged MAC frame into the OFDM frame including the sub-carrier information.

2. The adaptor of claim 1, wherein the SNI comprises:
 a wired interface to connect to a wired service network to transmit the MAC frame corresponding to the wired service to the frame conversion unit; and
 a wireless interface to connect to a wireless service network to transmit the MAC frame corresponding to the wireless service, or the CPRI data to the frame conversion unit.

3. The adaptor of claim 1, wherein the information extracting unit extracts the sub-carrier information and the OFDM interface port information using a hash value included in the overhead of the wired/wireless converged MAC frame.

4. The adaptor of claim 1, wherein the second frame conversion unit converts the wired/wireless converged MAC frame into the OFDM frame using an overhead including at least one of delimiter information indicating a start and an end of a frame, a bit-interleaved parity (BIP) field, a sub-carrier number, alarm indicator information indicating status of an optical line terminal (OLT) and an optical network unit (ONU), and OFDM status indication information.

5. The adaptor of claim 1, wherein the OFDM interface comprises:
 a sub-carrier control unit to generate sub-carrier control information by monitoring the data transmission characteristics; and
 an OFDM frame transmitting unit to transmit the OFDM frame through a dynamically allocated sub-carrier based on the sub-carrier control information.

6. A wired/wireless converged media access control (MAC) adaptor comprising:
 an orthogonal frequency division multiplexing (OFDM) interface to receive an OFDM frame from an optical OFDM modem;
 a frame conversion unit to convert the OFDM frame into a MAC frame corresponding to a wired or wireless service or common public radio interface (CPRI) data; and
 a service network interface (SNI) to output the MAC frame or the CPRI data,
 wherein the frame conversion unit comprises:
 a first frame conversion unit to convert the OFDM frame into a wired/wireless converged MAC frame comprising a common frame structure of the MAC frame or the CPRI data; and
 a second frame conversion unit to convert the wired/wireless converged MAC frame into the MAC frame or the CPRI data using overhead including at least one of payload length information, sub-carrier information, OFDM interface port information, type information of a frame inputted, and error correction information.

7. The adaptor of claim 6, wherein the SNI comprises:
 a wired interface to connect to a wired service network to transmit the MAC frame corresponding to the wired service to the frame conversion unit; and
 a wireless interface to connect to a wireless service network to transmit the MAC frame corresponding to the wireless service, or the CPRI data to the frame conversion unit.

8. The adaptor of claim 6, wherein the SNI outputs the MAC frame corresponding to the wired or wireless service, or the CPRI data using sub-carrier information, source address information, and input port information of the OFDM frame.

9. A method of transmitting a frame using a wired/wireless converged media access control (MAC) adaptor, the method comprising:
 transmitting a MAC frame corresponding to a wired or wireless service, or common public radio interface (CPRI) data;
 converting a wired/wireless converged MAC frame comprising a common frame structure of the MAC frame or the CPRI data, into an orthogonal frequency division multiplexing (OFDM) frame; and
 transmitting the OFDM frame to an optical OFDM modem by dynamically allocating sub-carriers based on data transmission characteristics,
 wherein the converting comprising:
 converting the MAC frame or the CPRI data into the wired/wireless converged MAC frame using an overhead including payload length information, sub-carrier information, OFDM interface port information, type information of a frame inputted, and error correction information.

10. The method of claim 9, wherein the converting of the wired/wireless converged MAC frame into the OFDM frame comprises:
    converting the MAC frame corresponding to the wired or wireless service, or the CPRI data into the wired/wireless converged MAC frame;
    extracting sub-carrier information for transmitting the OFDM frame from the wired/wireless converged MAC frame; and
    converting the wired/wireless converged MAC frame into the OFDM frame including the sub-carrier information.

11. The method of claim 9, wherein the converting of the wired/wireless converged MAC frame into the OFDM frame including the sub-carrier information comprises converting the wired/wireless converged MAC frame into the OFDM frame by adding, to the wired/wireless converged MAC frame, an overhead including at least one of delimiter information indicating a start and an end of a frame, a bit-interleaved parity (BIP) field, a sub-carrier number, alarm indicator information indicating status of an optical line terminal (OLT) and an optical network unit (ONU), and OFDM status indication information.

12. The method of claim 9, wherein the transmitting of the OFDM frame to the optical OFDM modem comprises:
    generating sub-carrier control information by monitoring the data transmission characteristics; and
    transmitting the OFDM frame through a dynamically allocated sub-carrier based on the sub-carrier control information.

* * * * *